Jan. 21, 1969  A. R. FINNIESTON  3,422,462
PROSTHETIC LEG HAVING ADJUSTABLE ALIGNMENT MEANS
Filed Sept. 7, 1966
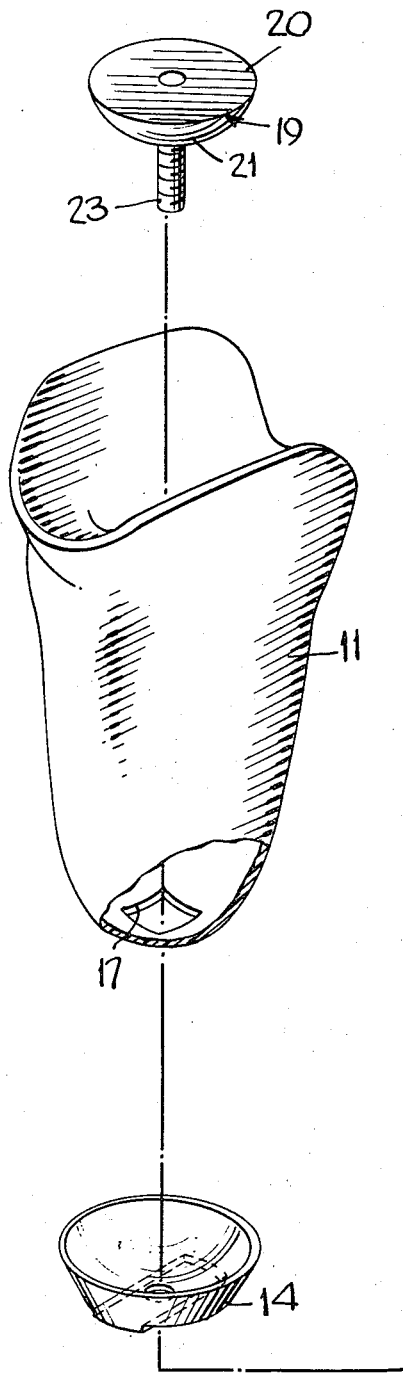
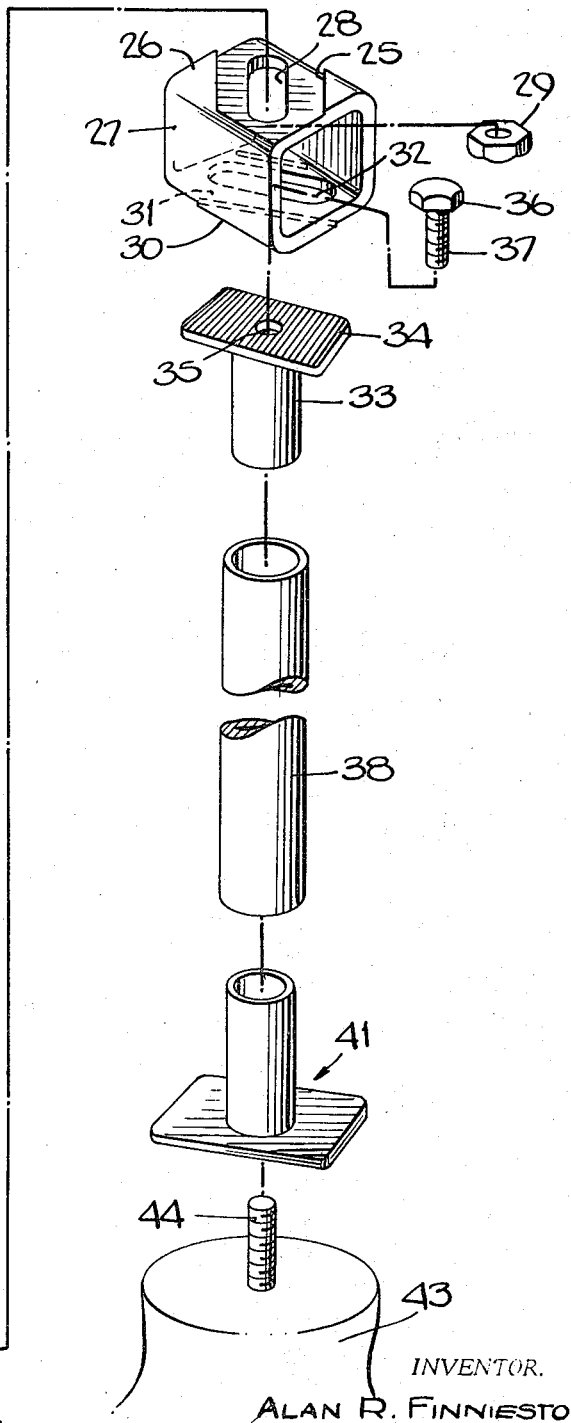
Fig. 5.
INVENTOR.
ALAN R. FINNIESTON
BY
ATTORNEYS

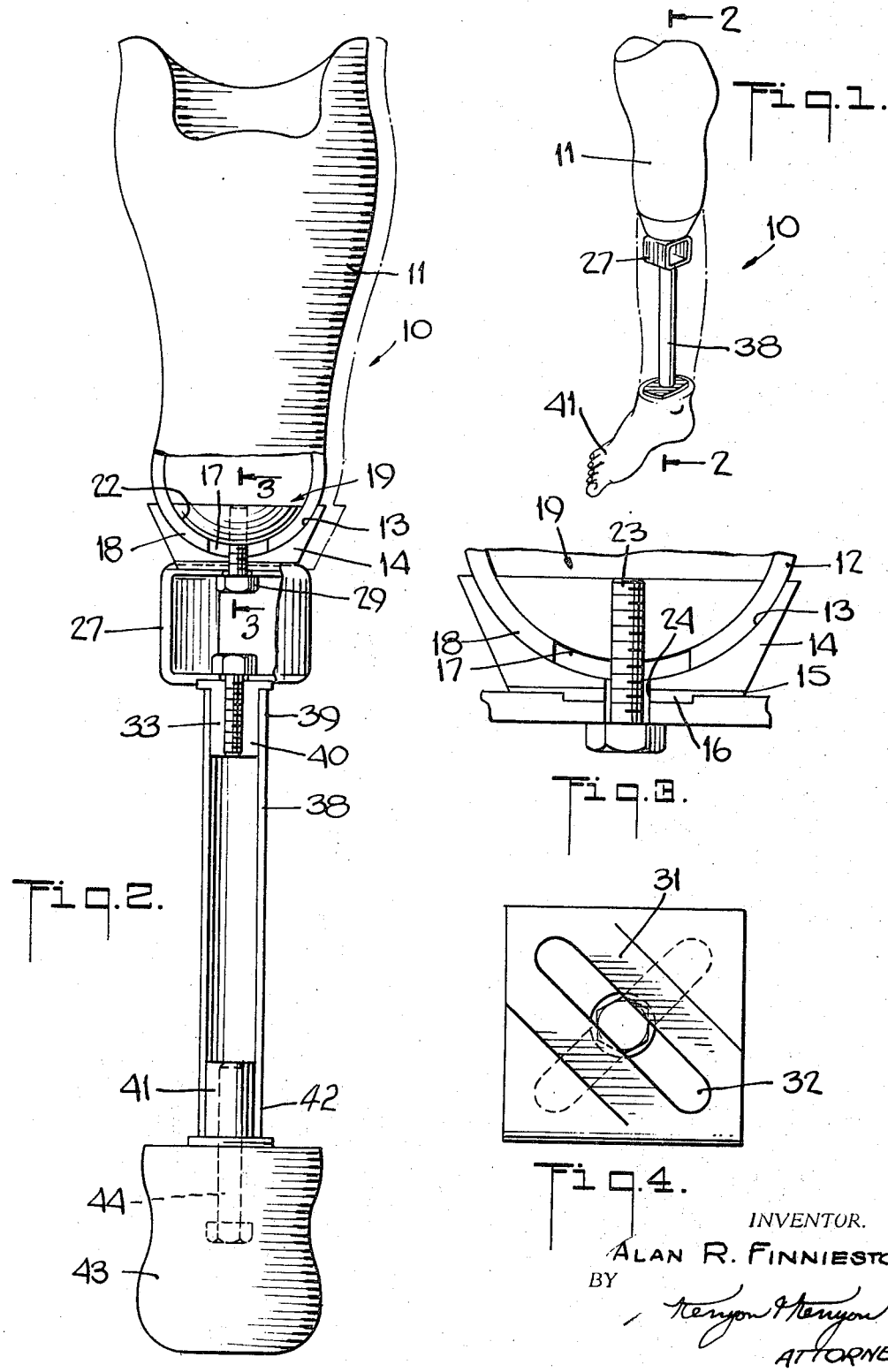

United States Patent Office 3,422,462
Patented Jan. 21, 1969

3,422,462
PROSTHETIC LEG HAVING ADJUSTABLE
ALIGNMENT MEANS
Alan R. Finnieston, 1901 NW. 17th Ave.,
Miami, Fla. 33125
Filed Sept. 7, 1966, Ser. No. 577,684
U.S. Cl. 3—21        5 Claims
Int. Cl. A61f 1/08; A61f 1/02

This invention relates to a prosthetic device incorporating dynamic alignment features in a mechanically simple, lightweight, inexpensive and practical instrument for the construction and fitting of above and below-knee prostheses.

Briefly, the device of the present invention comprises a molded socket member being generally rounded at its lower closed end and having a square hole therein which is received by a complementary shaped cup member which is slideably engaged through a bottom ridge in an adjustment groove incorporated in the upper surface of an alignment block or frame. After angular and lateral alignment of the socket member, cup and frame, bolt means passing through the three members clamps the parts together to maintain them in the preselected alignment. On the bottom of the alignment frame is a plug which has a similar ridge mating with a groove in the frame, the plug being affixed to a tubular extension carrying a similar plug at its bottom end which is threadably engaged with a foot member. The two lateral alignment grooves in the frame are aligned with elongated adjustment slots therein which bear a skewed relationship to one another.

The above arrangement provides prosthetic apparatus which is adjustable angularly, laterally as well as axially to provide a dynamic alignment device having unique properties over those devices serving similar purposes in the prior art. Other objects and features of the invention will become apparent from the following description, claims and drawings in which:

FIG. 1 is an isometric view of the assembly;
FIG. 2 is an enlarged section taken along lines 2—2 of FIG. 1;
FIG. 3 is a section taken along lines 3—3 of FIG. 2;
FIG. 4 is a bottom plan view of the lateral alignment frame; and
FIG. 5 is an enlarged exploded view of the socket member and associated parts.

Referring now to the drawings the apparatus is designated generally by reference number 10 and comprises a socket member 11 molded to conform to the specific stump to be aligned and generally employs Dacron, felt, fiberglass reinforcing and nylon stockinette laminated with plastic resins of any conventional desired type. The socket member 11 is molded at its lower end into a semi-round male unit 12 to conform to the inner concave surface 13 of cup member 14 constructed of plastics, metal, wood, fiber material or similar material having a flat bottom metal plate or disk 15 formed with rectangular bottom ridge 16.

Socket member 11 has square hole 17 at its bottom 18.

Bolt member 19 having flat upper head 20 and rounded bottom surface 21 dimensioned to conform generally to the bottom inner surface 22 of socket member 11 has threaded shank 23 which is disposed through hole 17 and extends downwardly through a corresponding hole 24 in cup member 14.

Rectangular ridge member 16 of cup 14 slideably engages correspondingly shaped diagonal groove 25 in upper surface 26 of alignment frame 27 and threaded shank 23 of bolt means 19 extends downwardly through slot 28 in frame 27 aligned with groove 25 and is threadably engaged by nut 29 to secure socket 11, cup 14 and alignment frame 27 in any desired angular or lateral orientation. Bottom surface 30 of alignment frame 27 carries a similar lateral groove 31 and aligned slot 32 which is angularly disposed relative to groove 25 and associated slot 28 above referred to in the upper surface 26. Plug member 33 having rectangular flat upper end flange 34 and hollow central core 35 extending axially therethrough is affixable to frame 27 by bolt means 36 when head 34 is slideably oriented into lateral groove 31. Central bore 35 of plug 33 is threaded to engage the threaded shank of bolt means 36. Intermediate tube member 38 is inserted at its upper end 39 over body 40 of plug 33 and affixed thereto by appropriate means such as cement or the like. Corresponding bottom plug 41 is similarly attached at bottom end 42 of tube 38 and artificial foot member 43 is secured to bottom plug 41 by bolt or screw means 44.

In use the socket member is first molded to conform to the desired limb portion and critical measurements are taken to insure the proper placement of the square hole 17 in the bottom thereof and an approximately three-fourths inch square hole is then formed. The socket bolt means 19 is inserted through the top of the socket member 11 and into the square hole male socket joint. The socket member 11 and bolt means 19 is then inserted into the cup member 14 and the latter combination is joined to the alignment frame 27 by insertion of ridge member 16 in groove 25 with the bolt shank 23 extending through lateral slot 28. The socket member 11 may be angularly adjusted for proper position and then cup 14 can be laterally adjusted as desired at which point the nut 29 can be tightened to maintain the above adjustments. The plug member 33 is attached to the bottom of frame 27 so that its flange 34 slides in groove 31 and the desired lateral position of plug 33 relative to frame 27 is maintained by tightening bolt 36. Intermediate tube 28 of the proper height adjustment is then affixed to plug 33 and bottom plug 41 and foot member 43 attached thereto by bolt 44. Foot member 43 is a standard prosthetic foot and a cosmetic cover (not shown) is constructed of flexible or rigid material to duplicate the measurements and shape of the stable limb. This encases the whole prosthesis and at any time may easily be removed to adjust dynamic alignment thereof.

The socket member is normally constructed of plastic but may also be made of wood, metal or fiber. While the alignment frame 27 containing the diagonal grooves can be one of many shapes, a diagonal cut in a square extrusion is generally preferable to reduce expense of construction. The upper bolt means 19 may be constructed of plastics, metal, wood or fiber or the like and may be round, semi-round or oval. The bottom square hole male socket joint section of socket member 11 may be constructed of plastic, metal, wood or fiber. Cup member 14 may be constructed of plastic, wood, metal or fiber and may be oval, round or semi-round. The alignment frame 27 likewise can be constructed of any of the above materials and may be square, round, oval or rectangular in shape as may be the upper plug member 33, intermediate tube 38 and bottom plug 41.

It can be seen from the above description that the present invention provides novel dynamic prosthetic alignment means which is capable of periodic realignment to compensate for changes in the patient. It is apparatus which is inexpensive and easily constructed, has light weight and adequate strength, as well as comfort and appearance.

While one embodiment of the invention has been shown and described it is to be understood that changes and additions can be made by those skilled in the art without departing from the scope and spirit of the invention.

I claim:

1. Prosthetic apparatus comprising a socket member adapted to receive a human stump in conforming relationship, said socket member being generally rounded at its lower closed end and having a hole in said end, a cup member having an inner generally concave surface adapted to receive said closed end of said socket member, said cup member having a bottom with a bottom ridge thereon, lateral adjustment means including a pair of anchor plates supported at spaced positions and having respective slotted portions therethrough, one said anchor plate having a grooved portion in its outer surface aligned with said slotted portion and dimensioned to receive said ridge of said cup bottom, the other said anchor plate having a similar grooved portion in its outer surface aligned with its said slotted portion, a first bolt means for securing said socket and cup in an aligned position to said one anchor plate, a first plug member having a head adapted for slideable engagement in the groove in said other anchor plate, second bolt means extending through said slotted portion in the latter said plate for securing said plug to said plate in a laterally aligned position, an intermediate extension member joined at one end to said first plug member, a second plug member secured to the other end of said extension member and a foot member joined to said second plug member.

2. Prosthetic leg apparatus comprising a socket member adapted to receive a human stump in conforming relationship, said socket member being generally rounded at its lower closed end and having a hole in said end, a cup member having an inner generally concave surface adapted to receive said closed end of said socket member, said cup member having a bottom with a bottom ridge thereon, lateral adjustment means including a pair of anchor plates supported at axially spaced positions and having respective slotted portions therethrough at skewed positions relative to one another, one said anchor plate having a grooved portion in its outer surface aligned with said slotted portion and dimensioned to receive said ridge of said cup bottom, the other said anchor plate having a similar grooved portion in its outer surface aligned with its said slotted portion, a first bolt means for securing said socket and cup in an aligned position to said one anchor plate, a first plug member having a head adapted for slideable engagement in the groove in said other anchor plate, second bolt means extending through said slotted portion in the latter said plate for securing said plug to said plate in a laterally aligned position, an intermediate extension member joined at one end to said first plug member, a second plug member secured to the other end of said extension member and a foot member joined to said second plug member.

3. Prosthetic leg apparatus comprising a socket member adapted to receive a human stump in conforming relationship, said socket member being generally rounded at its lower closed end and having a square hole in said end, a cup member having an inner generally concave surface adapted to receive said closed end of said socket member, said cup member having a generally flat bottom with a bottom ridge thereon, lateral adjustment means including a pair of transverse upper and lower anchor plates supported at axially spaced positions and having respective slotted portions therethrough at skewed positions relative to one another, one said upper anchor plate having a grooved portion in its upper surface aligned with said slotted portion and dimensioned to receive said ridge of said cup bottom, said lower anchor plate having a similar grooved portion in its lower surface aligned with its said slotted portion, first bolt means for securing said socket and cup in aligned position to said upper anchor plate, a first plug member having a head adapted for slideable engagement in the groove in said lower anchor plate, second bolt means extending through said slotted portion in the latter said plate for securing said plug to said plate in a laterally aligned position, an intermediate extension member joined at one end to said first plug member, a second plug member secured to the other end of said extension member and a foot member joined to said second plug member.

4. Prosthetic leg apparatus comprising a molded socket member adapted to receive a human stump in conforming relationship, said socket member being generally rounded at its lower closed end and having a square hole in said end, a cup member having an inner generally concave surface adapted to receive said closed end of said socket member, said cup member having a generally flat bottom with a centrally disposed bottom ridge thereon, lateral adjustment means including a pair of transverse upper and lower anchor plates supported at axially spaced positions and having respective slotted portions therethrough at skewed positions relative to one another, said upper anchor plate having a grooved portion in its upper surface aligned with said slotted portion and dimensioned to receive said ridge of said cup bottom, the other said lower anchor plate having a similar grooved portion in its lower surface aligned with its said slotted portion, first bolt means engageable with the inner rounded closed end of said socket member and having a shank extending through said square hole and slotted portion of said upper anchor plate for securing said socket and cup in an aligned position to said upper anchor plate, a first plug member having a head adapted for slideable engagement in the groove in said lower anchor plate, second bolt means extending through said slotted portion in the latter said plate for securing said plug to said plate in a latter aligned position, an intermediate extension member joined at one end to said first plug member, a second plug member secured to the other end of said extension member and a foot member joined to said second plug member.

5. Prosthetic leg apparatus comprising a molded socket member adapted to receive a human stump in conforming relationship, said socket member being generally rounded at its lower closed end and having a square hole in said end, a cup member having an inner generally concave surface adapted to receive said closed end of said socket member, said cup member having a generally flat bottom with a centrally disposed bottom rectangular ridge thereon, lateral adjustment means including a pair of transverse upper and lower anchor plates supported at axially spaced positions and having respective slotted portions therethrough at skewed positions relative to one another, said upper anchor plate having a grooved portion in its upper surface aligned with said slotted portion and dimensioned to receive said ridge of said cup bottom, said lower anchor plate having a similar grooved portion in its lower surface aligned with its said slotted portion, first bolt means having a head with an upper flat surface and a rounded underside engageable with the inner rounded closed end of said socket member and having a shank extending through said square hole and slotted portion of said upper anchor plate for securing said socket and cup in an aligned position to said upper anchor plate, a first plug member having a head adapted for slideable engagement in the groove in said lower anchor plate, second bolt means extending through said slotted portion in the latter said plate for securing said plug to said plate in a laterally aligned position, an intermediate extension member joined at one end to said first plug member, a second plug member secured to the other end of said extension member and a foot member joined to said second plug member.

References Cited

UNITED STATES PATENTS

| | | | |
|---|---|---|---|
| 2,897,512 | 8/1959 | Sackett | 3—22 |
| 3,273,168 | 9/1966 | Gardner et al. | 3—1 |

FOREIGN PATENTS

| | | |
|---|---|---|
| 1,274,616 | 9/1961 | France. |
| 1,445,102 | 5/1966 | France. |
| 978,586 | 12/1964 | Great Britain. |

OTHER REFERENCES

Temporary Prostheses for Lower Extremity Amputees (A Technical Report), VA Prosthetics Center, 252 7th Ave., New York, N.Y., Pamphlet TR–1, Sept. 1, 1962, pp. 17–20 and 26.

RICHARD A. GAUDET, *Primary Examiner.*

RONALD L. FRINKS, *Assistant Examiner.*

U.S. Cl. X.R.

3—17